United States Patent
Asano et al.

(10) Patent No.: US 7,471,807 B2
(45) Date of Patent: Dec. 30, 2008

(54) DIGITAL WATERMARK DETECTION METHOD AND APPARATUS

(75) Inventors: Wataru Asano, Yokohama (JP); Tomoo Yamakage, Yokohama (JP); Shinichiro Koto, Machida (JP); Nakaba Kogure, Zama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1038 days.

(21) Appl. No.: 10/808,279

(22) Filed: Mar. 25, 2004

(65) Prior Publication Data

US 2005/0053259 A1 Mar. 10, 2005

(30) Foreign Application Priority Data

Sep. 5, 2003 (JP) ............... 2003-314326

(51) Int. Cl.
  *G06K 9/00* (2006.01)
(52) U.S. Cl. .................................. 382/100
(58) Field of Classification Search ............ 382/100
  See application file for complete search history.

(56) References Cited

U.S. PATENT DOCUMENTS

| 5,930,369 | A | * | 7/1999 | Cox et al. ............... 380/54 |
| 5,940,135 | A | | 8/1999 | Petrovic et al. |
| 6,145,081 | A | | 11/2000 | Winograd et al. |
| 6,175,627 | B1 | | 1/2001 | Petrovic et al. |
| 6,996,250 | B2 | * | 2/2006 | Nakamura et al. ...... 382/100 |
| 7,284,130 | B2 | * | 10/2007 | Asano et al. ............. 713/176 |
| 2003/0091213 | A1 | * | 5/2003 | Yamakage et al. ....... 382/100 |
| 2003/0108219 | A1 | * | 6/2003 | Muratani et al. ........ 382/100 |
| 2005/0053259 | A1 | | 3/2005 | Asano et al. |

FOREIGN PATENT DOCUMENTS

| JP | 2001-218044 | 8/2001 |
| JP | 2001-518651 | 10/2001 |
| JP | 2002-325233 | 11/2002 |

OTHER PUBLICATIONS

U.S. Appl. No. 11/467,804, filed Aug. 28, 2006, Kogure, et al.
U.S. Appl. No. 10/626,610, filed Jul. 25, 2003, Asano et al.
U.S. Appl. No. 10/649,830, filed Aug. 28, 2003, Koto et al.

* cited by examiner

*Primary Examiner*—Tom Y Lu
(74) *Attorney, Agent, or Firm*—Oblon, Spivak, McClelland, Maier & Neustadt, P.C.

(57) ABSTRACT

An image size reduction unit reduces the image size of an input image signal, thereby generating a size-reduced image signal. A specific frequency component extraction unit extracts a specific frequency component signal from the size-reduced image signal. A phase controller controls the phase of the specific frequency component signal. A correlator computes a cross-correlation value between the phase-controlled specific frequency component signal and size-reduced image signal. A watermark information estimation unit estimates, from the cross-correlation value, watermark information embedded in the input image signal.

7 Claims, 7 Drawing Sheets

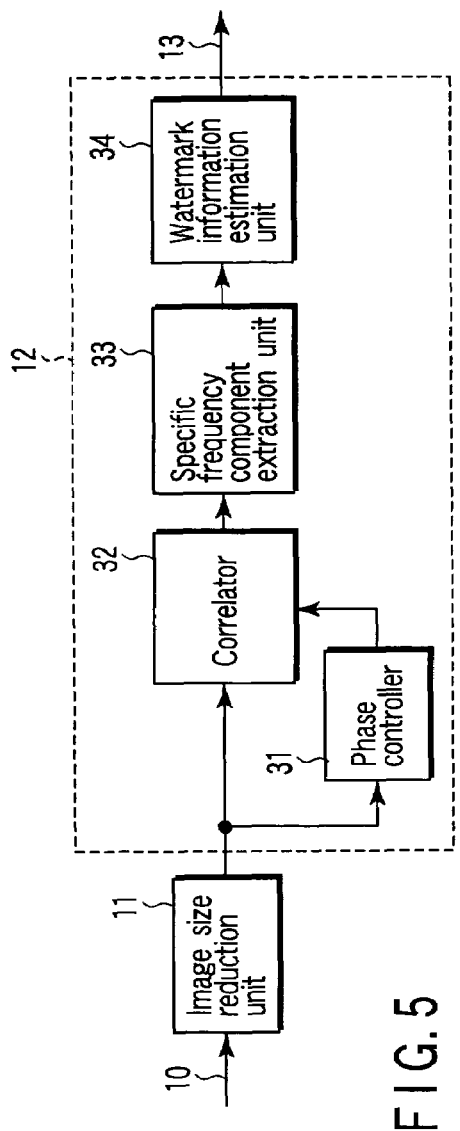
F I G. 5
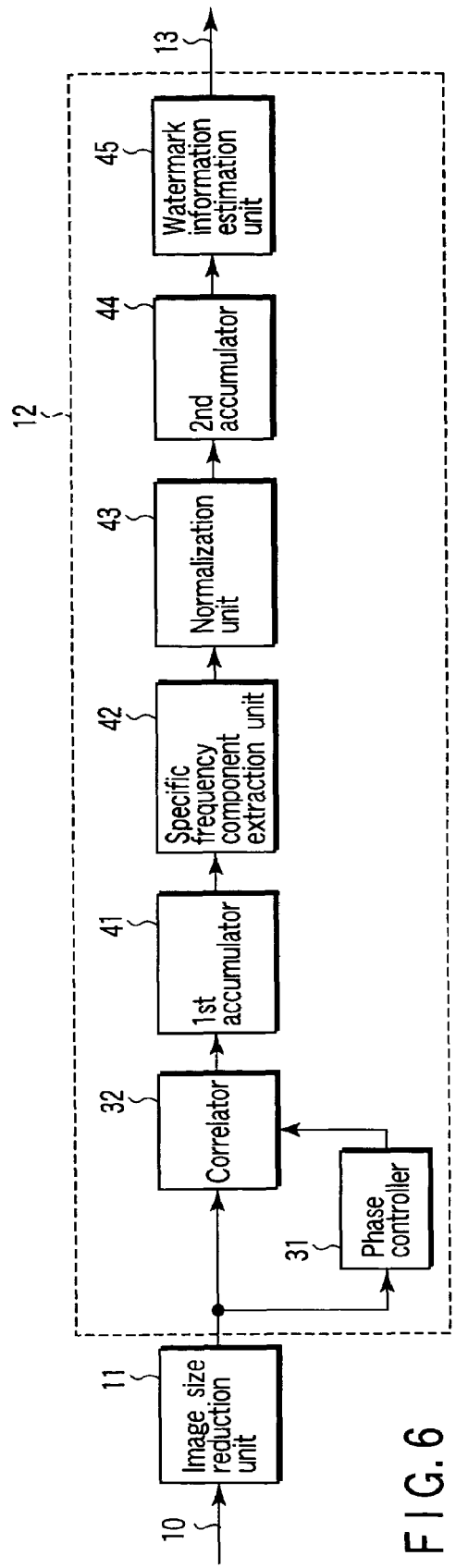
F I G. 6

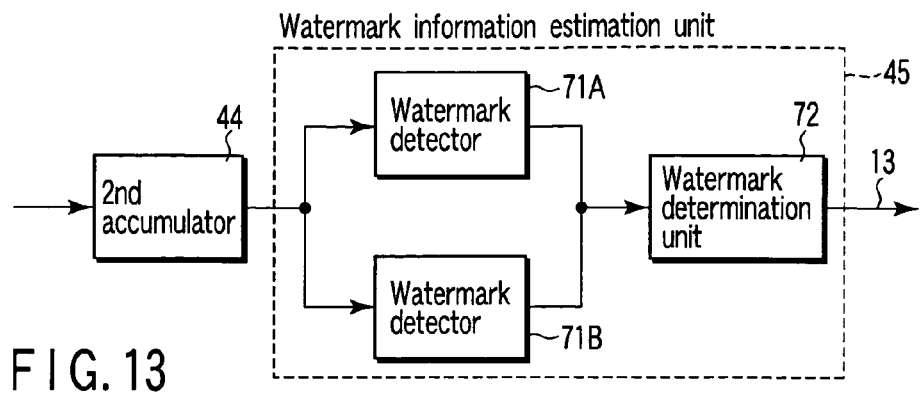
F I G. 13
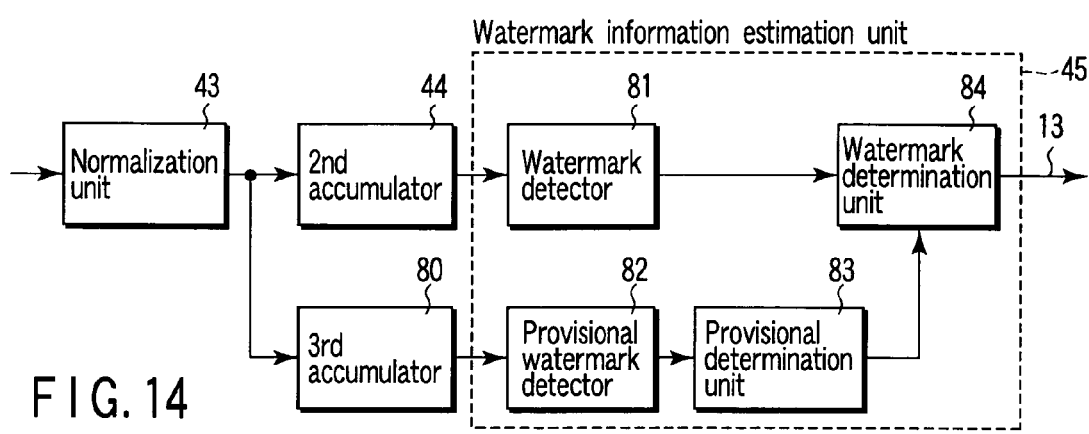
F I G. 14
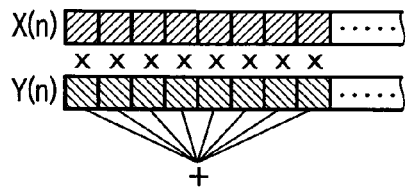
F I G. 15
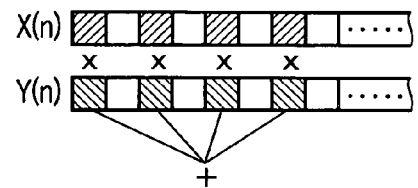
F I G. 16
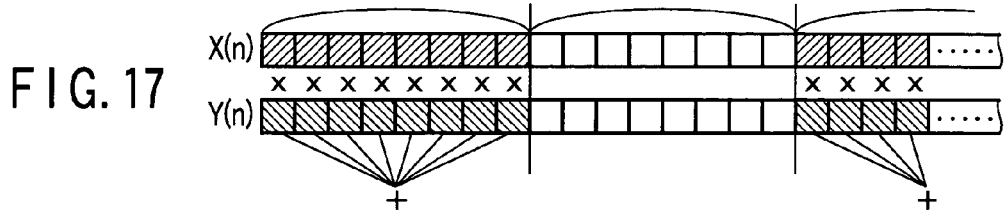
F I G. 17
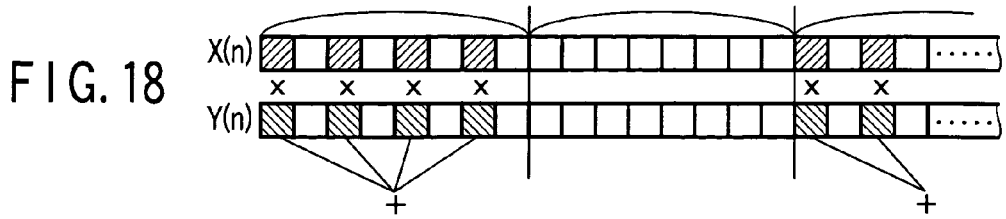
F I G. 18

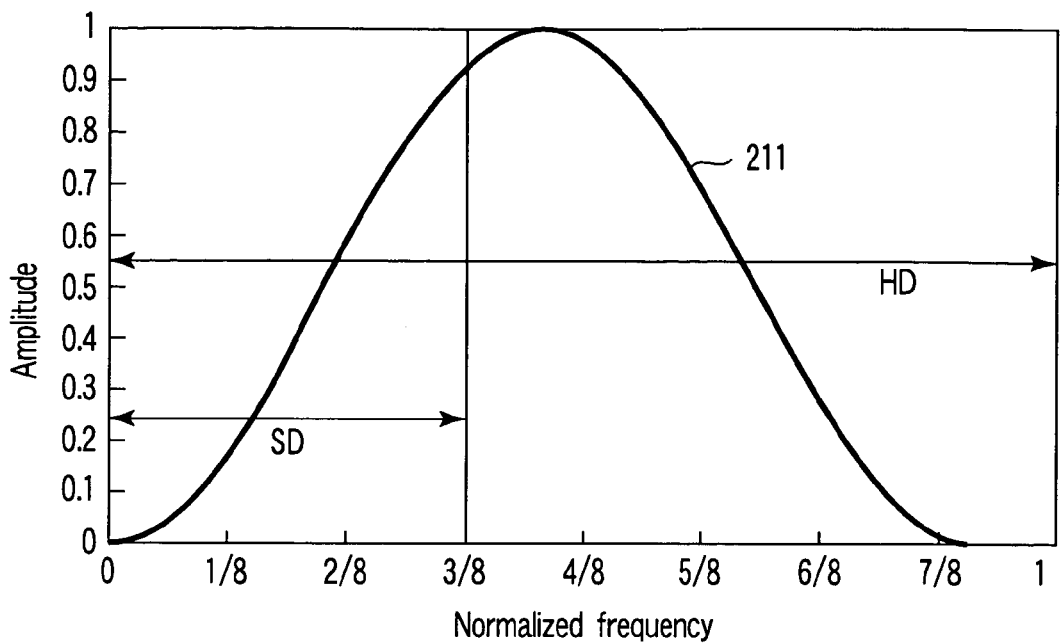
F I G. 21
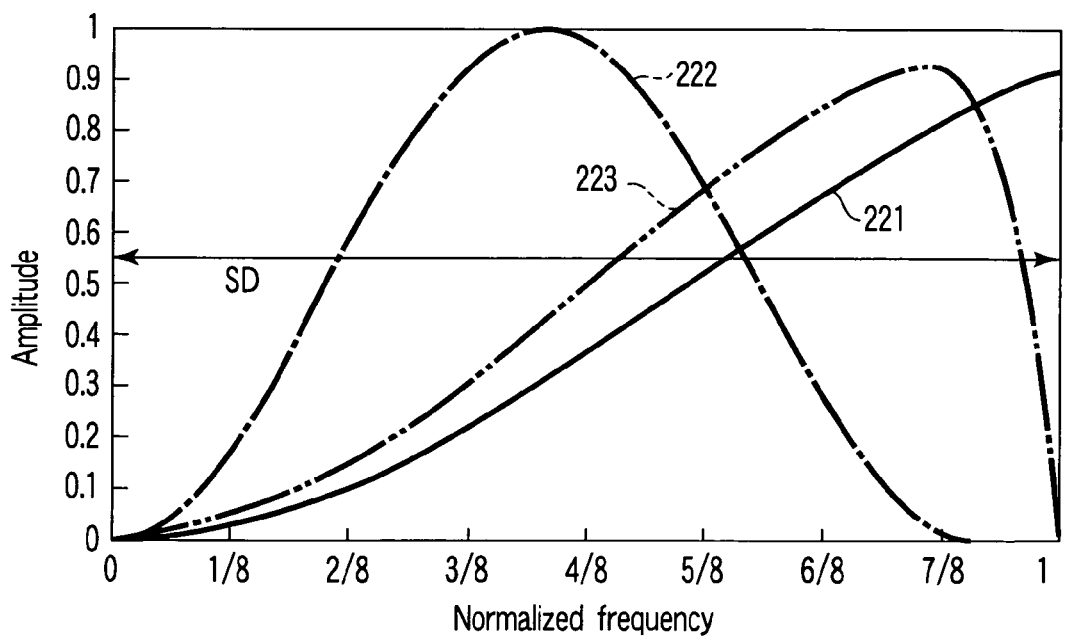
F I G. 22

DIGITAL WATERMARK DETECTION METHOD AND APPARATUS

CROSS-REFERENCE TO RELATED APPLICATIONS

This application is based upon and claims the benefit of priority from prior Japanese Patent Application No. 2003-314326, filed Sep. 5, 2003, the entire contents of which are incorporated herein by reference.

BACKGROUND OF THE INVENTION

1. Field of the Invention

The present invention relates to a digital watermark detection method and apparatus useful in preventing illegal copies of a digital video signal provided via, for example, a recording medium.

2. Description of the Related Art

As apparatuses for recording and playing back digital image data, such as a digital VTR, DVD (Digital Versatile Disk), and the like have prevailed, the number of digital moving images that can be played back by these apparatuses are provided. Various digital moving images are distributed via digital television broadcast via the Internet, broadcast satellite, communication satellite, and the like, enabling users to enjoy high-quality digital moving images.

It is easy to form high-quality copies from digital moving images on the digital signal level. Therefore, if some copy protection or copy control is not applied to digital moving images, there is the danger of unrestricted formation of copies of digital images. Therefore, illicit copies of digital images must be prevented, and the number of generations of copies formed by authorized users must be restricted. For this purpose, a method of appending information for copy control to each digital moving image, and preventing illicit copies or restricting copies has been proposed.

As a technique for superposing additional information to a digital moving image in such a way, digital watermarking is known. In digital watermarking, information such as identification information of the copyright owner or user of contents, right information of the copyright owner, use conditions of contents, secret information required upon using contents, the aforementioned copy control information, or the like (such information will be referred to as watermark information hereinafter) is embedded in contents of audio data, music data, moving image data, still image data, or the like, which has been converted into digital data, so as not to be easy to perceive. By detecting the embedded watermark information from the contents later as needed, copyright protection, including use control and copy control, can be achieved, and further use of the contents is possible.

As a conventional method of digital watermarking, a method that applies a spread spectrum technique is known. In this method, watermark information is embedded in a digital moving image in the following sequence.

In step E1, an image signal undergoes spread spectrum by being multiplied by a PN (Pseudorandom Noise) sequence.

In step E2, the image signal after spread spectrum undergoes frequency transformation (e.g., DCT transformation).

In step E3, watermark information is embedded in the image signal by changing the values of specific frequency components.

In step E4, the image signal undergoes inverse frequency transformation (e.g., IDCT transformation).

In step E5, the image signal undergoes inversely spread spectrum (the image signal is multiplied by the same PN sequence as in step E1).

Watermark information is detected in the following sequence, from the digital moving image, in which the watermark information has been embedded in the above sequence.

In step D1, the image signal undergoes spread spectrum by being multiplied by a PN (Pseudorandom Noise) sequence (the same PN sequence as in step E1).

In step D2, the image signal after spread spectrum undergoes frequency transformation (e.g., DCT transformation).

In step D3, the embedded watermark information is extracted from the image signal while paying attention to the values of specific frequency components.

When digital watermarking is applied to digital productions for the purpose of prevention of illicit use, a characteristic (robustness) that can prevent watermark information from being lost or tampered with, and deliberate attacks which are normally carried out on digital productions must be provided to digital watermarking. As attacks that make the watermark information of a digital image impossible to detect, cut-out, scaling (enlargement/reduction), rotation, and the like of an image are known.

When an image that has suffered such attacks is input, the conventional technique recovers synchronization of a PN sequence by executing a process for estimating a PN sequence used in step E1 at the time of embedding upon detection of watermark information. After that, the processes in steps D1 to D3 are executed to extract the embedded watermark information. However, in order to recover synchronization of the PN sequence from the image signal alone, a search must be conducted by trying a process for detecting watermark information using a plurality of candidates of PN sequences and adopting a candidate that can be detected satisfactorily. For this purpose, problems of increases in arithmetic operation volume and circuit scale are posed. Further, since a watermark embedded in an image signal under an attack of scaling or rotation is weakened, it is very possible that the watermark cannot be detected even if the contents (scaling, rotation, etc.) of the attack are detected and a detection method corresponding to the attack is utilized.

BRIEF SUMMARY OF THE INVENTION

It is an object of the present invention to provide a digital watermark detection method and apparatus, which can more accurately detect watermark information weakened by an attack such as image cutout, scaling, rotation, etc., without increasing the operation amount and circuit scale.

According to an aspect of the invention, to detect watermark information embedded in an input-image signal, an image size of the input image signal is reduced, thereby generating a size-reduced image signal and detecting the watermark information in the size-reduced image signal. The image size reduction of the input image signal is realized by reducing, for example, the resolution of the signal.

According to another aspect of the invention, a specific frequency component signal is extracted from the size-reduced image signal. The phase of the extracted specific frequency component signal is controlled, and the cross-correlation value between the phase-controlled specific frequency component signal and the size-reduced image signal is computed. From the cross-correlation value, the watermark information is detected.

According to yet another aspect of the invention, the auto-correlation function of the size-reduced image signal is computed. A specific frequency component signal is generated by filtering the auto-correlation function, and the watermark information is detected in the specific frequency component signal. The auto-correlation function is acquired by a correlation operation performed on the size-reduced image signal and the phase-controlled image signal corresponding thereto. The size-reduced image signal may be subjected to rotation processing before the auto-correlation function is computed.

According to a further aspect of the invention, the auto-correlation function of the size-reduced image signal is computed. The auto-correlation function is accumulated for a first period of time to generate a first accumulation signal. A specific frequency component signal is extracted from the first accumulation signal, and the amplitude of the specific frequency component signal is normalized. The normalized specific frequency component signal is accumulated for a second period of time longer than the first period of time to generate a second accumulation signal. The watermark information is estimated from the second accumulation signal.

The input image signal is a high definition (HD) image signal, and the size-reduced image signal is a standard definition (SD) image signal into which the HD image signal is converted.

BRIEF DESCRIPTION OF THE SEVERAL VIEWS OF THE DRAWING

FIG. 5 is a block diagram showing a digital watermark detection apparatus according to a third embodiment of the present invention;

FIG. 6 is a block diagram showing a digital watermark detection apparatus according to a fourth embodiment of the present invention;

FIG. 13 is a block diagram illustrating a second concrete example of the watermark estimation unit incorporated in the digital watermark detection apparatus;

FIG. 14 is a block diagram illustrating a third concrete example of the watermark estimation unit incorporated in the digital watermark detection apparatus;

FIG. 15 is a view illustrating a general correlation operation;

FIG. 16 is a view illustrating a correlation operation performed on every other pixel;

FIG. 17 is a view illustrating a correlation operation performed on eight pixels contained in every other block;

FIG. 18 is a view illustrating a correlation operation performed on every other pixels contained in every other block;

FIG. 21 is a graph illustrating the frequency characteristic of digital watermark information embedded in an HD image signal;

FIG. 22 is a graph useful in explaining the frequency characteristics of a specific frequency signal extracted from an SD image signal that is obtained by down-converting an HD image signal.

DETAILED DESCRIPTION OF THE INVENTION

First Embodiment

Figure 1:
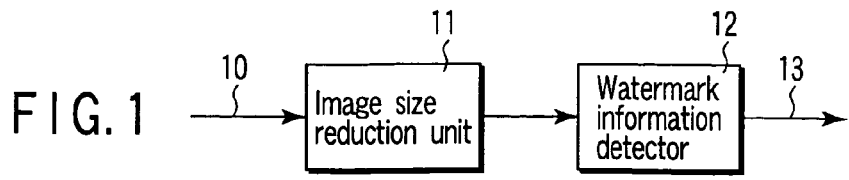
FIG. 1 is a block diagram showing a digital watermark detection apparatus according to a first embodiment of the present invention.

In the most basic digital watermark detection apparatus shown in FIG. 1 according to a first embodiment of the invention, an input image signal 10 having watermark information embedded therein is input to an image size reduction unit 11. The image size reduction unit 11 reduces the size of an image corresponding to the input image signal 10 (i.e., reduces the size of image data contained in the input image signal). The image size is generally defined by (number of pixels in the horizontal direction×number of pixels in the vertical direction) of an image. Accordingly, the image size reduction unit 11 reduces the resolution of an image for size reduction, thereby generating a size-reduced image signal of a reduced resolution.

The size-reduced image signal generated by the image size reduction unit 11 is input to a watermark information detector 12, which, in turn, detects digital watermark information in the signal. The method for detecting digital watermark information will be described later in detail. The watermark information detector 12 outputs detected digital watermark information 13.

As stated above, even in a high-resolution image, the embodiment can detect digital watermark information simply by adding the cost required for size reduction processing to the cost required for conventional standard watermark information detection.

Descriptions will be given of other embodiments in which the watermark information detector 12 is modified in various manners. Digital watermark detection apparatuses according to the other embodiments, described below, receive, from a recording medium or transmission medium, an image signal having digital watermark information embedded therein and generated by a digital watermark embedding apparatus (not shown) corresponding to the digital watermark information detection apparatuses.

This digital watermark embedding apparatus will now be described briefly. In the digital watermark embedding apparatus, a specific frequency component signal extraction unit extracts, from an original image signal, a specific frequency component, for example, a relatively high frequency component. The specific frequency component signal is subjected to phase control, performed by a phase controller in accordance with a specific phase control amount that is predetermined by digital watermark information to be embedded into an input image signal. The phase-controlled specific frequency component signal is supplied to a watermark information superposition unit formed of a digital adder, where it is superposed upon the original image signal. As a result, an image signal embedded with watermark information is generated.

Such a digital watermark embedding apparatus as described above is disclosed in, for example, U.S. patent application Ser. No. 10/327,072, the entire contents of which are incorporated herein by reference.

The thus-obtained image signal embedded with watermark information is recorded on a recording medium by, for example, a digital image recording/reproducing apparatus, such as a DVD, or transmitted via a transmission medium, such as the Internet, a broad-casting satellite, a communication satellite, etc.

Second Embodiment

Figure 2:
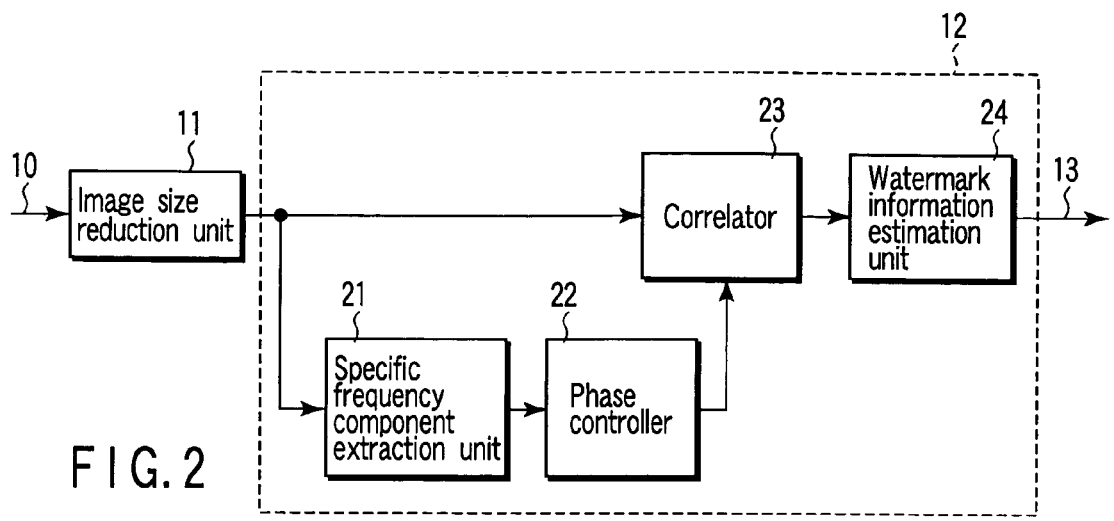
FIG. 2 is a block diagram showing a digital watermark detection apparatus according to a second embodiment of the present invention.

In the second embodiment shown in FIG. 2, a size-reduced image signal from the image size reduction unit 11 is input to the input of a specific frequency component extraction unit 21 and the first input of a correlator 23, which are incorporated in the watermark information detector 12.

The watermark information detector 12 comprises the specific frequency component extraction unit 21, phase controller 22, correlator 23 and watermark information estimation unit 24. The specific frequency component extraction unit 21 is formed of a digital filter of the same frequency band as that of a specific frequency component extraction unit incorporated in the aforementioned digital watermark embedding apparatus.

More specifically, the unit 21 is formed of an HPF (High Pass Filter) having a specific cutoff frequency, or a BPF (Band Pass Filter) having a passband center frequency. The specific frequency component extraction unit 21 extracts a specific frequency component, such as a relatively high frequency component, from a size-reduced image signal.

Figure 3:
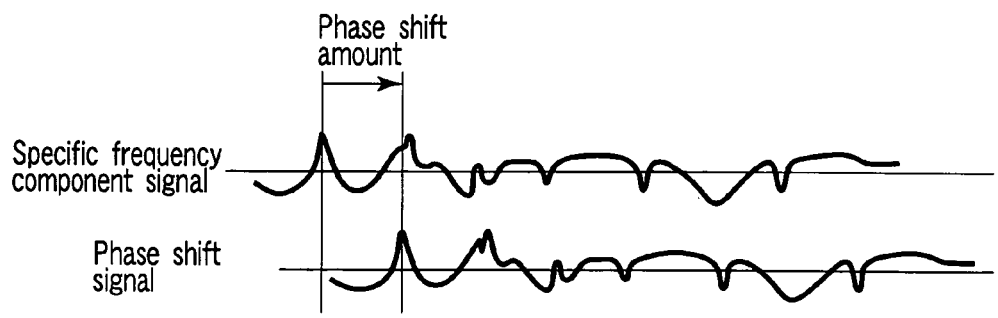
FIG. 3 is a chart for explaining phase shift of a specific frequency signal by the phase controller shown in FIG. 2.

The specific frequency component signal is subjected to phase control of a predetermined phase control amount by the phase controller 23, i.e., the signal is phase-shifted. The phase controller 22 is, for example, a digital phase shifter. In the phase shift example in FIG. 3 using the phase controller 22, the phase of the specific frequency component signal is shifted with its original waveform maintained. The amount of phase shift is controlled continuously or stepwise.

The phase-controlled specific frequency component signal is supplied to the second input of the correlator 23. The correlator 23 computes a cross-correlation value between the specific frequency component signal having its phase controlled by the phase controller 22, and the size-reduced image signal. The cross-correlation value is output from the correlator 23 to the watermark information estimation unit 24.

Figure 4:
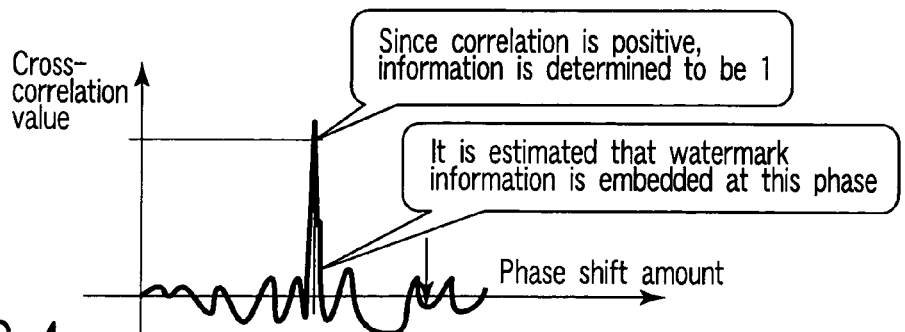
FIG. 4 is a graph useful in explaining a search for a peak in cross-correlation value and watermark information detection, performed in the digital watermark detection apparatus according to the second embodiment of the present invention.

The watermark information estimation unit 24 searches for a peak in the cross-correlation value (signal), as shown in, for example, FIG. 4, thereby detecting watermark information by estimation. In the cross-correlation value with respect to the phase shift amount of the phase controller 22, a peak appears at a certain phase-shift amount. The polarity of the peak indicates the presence of watermark information. If the input image signal 10 is under an attack of scaling, the phase shift amount of a specific frequency component contained in the input image signal 10 differs from the amount of phase shift performed on the specific frequency component by the digital watermark embedding apparatus.

In light of this, in the embodiment, the phase shift amount in the phase controller 22 is varied continuously or stepwise, thereby enabling the watermark information estimation unit 24 to search for peak in the cross-correlation value (signal) output from the correlator 23. Presence of watermark information is determined from the polarity of the peak that has been discovered. The peak in the cross-correlation value (signal) assumes a positive or negative polarity in accordance with the value of watermark information. In the example of FIG. 4, if the polarity of the peak is positive, it is determined that the watermark information assumes a value of "1", while if the polarity of the peak is negative, it is determined that the watermark information assumes a value of "0". Thus, the watermark information estimation unit 24 outputs detected watermark information 13.

As described above, in the first embodiment, a specific frequency component signal is extracted from a size-reduced image signal obtained by subjecting the input image signal to size reduction in the watermark information detector 12, and is subjected to phase control. The cross-correlation value between the phase-controlled specific frequency component signal and the size-reduced image signal is computed, whereby watermark information is detected from the cross-correlation value. Watermark information can be easily detected from an input image signal against which an attack of scaling was made, by searching for a peak in the cross-correlation value, while varying the amount of phase control.

The watermark information detector 12 shown in FIG. 2 can detect watermark information in an image signal under an attack of scaling. Accordingly, size reduction processing can be performed on the input image signal 10 before extracting a specific frequency component signal. This being so, watermark information can be extracted even from a high-resolution input image signal, simply by adding the cost required for size reduction.

Third Embodiment

In the third embodiment shown in FIG. 5, a size-reduced image signal from the image size reduction unit 11 is input to the input of a specific frequency component extraction unit 31 and the first input of a correlator 32. The size-reduced image signal having its phase controlled by the phase controller 31 is input to the second input of the correlator 32. The correlator 32 performs correlation between the signals input to its first and second inputs, thereby generating an auto-correlation function. This auto-correlation function is input to a specific frequency component extraction unit 33.

The specific frequency component extraction unit 33 comprises an HPF or a BPF, as in the specific frequency component extraction unit 21 shown in FIG. 2, and extracts a specific frequency component by filtering the auto-correlation function. The extracted specific frequency component signal is input to a watermark information estimation unit 34, where the peak level of the extracted specific frequency component signal is searched for, and the polarity of the peak level is determined.

The peak level of the extracted specific frequency component signal assumes a positive or negative polarity in accordance with the value of watermark information embedded in the input image signal 10. If the polarity of the peak level is positive, a watermark information estimation unit 34 estimates that the watermark information assumes a value of "1", while if the polarity of the peak level is negative, the unit 34 estimates that the watermark information assumes a value of "0". Thus, the watermark information estimation unit 34 outputs detected watermark information 13. If phase control by the phase controller 31, a correlation operation by the correlator 32 and filtering by the specific frequency component extraction unit 33 are linear operations, the digital watermark detection apparatus of the third embodiment is equivalent to that shown in FIG. 2.

In the third embodiment, the watermark information detector 12 computes the auto-correlation function of a size-reduced-image signal, and filters this function to generate a specific frequency component signal. Watermark information can be easily detected from an input image signal against which an attack of scaling was made, by computing the auto-correlation function of the size-reduced image signal while varying the amount of phase control performed on the size-reduced image signal, searching for the peak level of the specific frequency component signal, and determining the polarity of the peak level.

The watermark information detector 12 shown in FIG. 5 can also detect watermark information in an image signal under an attack of scaling. Accordingly, size reduction processing can be performed on the input image signal 10 before extracting a specific frequency component signal. This being so, watermark information can be extracted even from a high-resolution input image signal, simply by adding the cost required for size reduction.

Fourth Embodiment

Referring to FIG. 6, a digital watermark detection apparatus according to a fourth embodiment will be described. In FIG. 6, a size-reduced image signal from the image size reduction unit 11 is input to the input of a specific frequency component extraction unit 31 and the first input of a correlator 32. The size-reduced image signal having its phase controlled by the phase-controller 31 is input to the second input of the correlator 32. The correlator 32 performs correlation between the signals input to its first and second inputs, thereby generating an auto-correlation function. The process so far is similar to that employed in the third embodiment.

In the fourth embodiment, the auto-correlation function from the correlator 32 is input to a first accumulator 41. The first accumulator 41 accumulates the auto-correlation function for a first short period of time corresponding to several lines, one field, several fields, one frame, or several frames, in which the characteristics of an image corresponding to the input image signal does not significantly change, thereby generating a first accumulation signal. The accumulator 41 is reset each time the first accumulation signal is generated, and resumes accumulation of the auto-correlation function.

The first accumulation signal is input to a specific frequency component extraction unit 42, where it is filtered. As a result, a specific frequency component signal is extracted. The specific frequency component signal is input to a normalization unit 43. The normalization unit 43 normalizes the amplitude of the specific frequency component signal so that the characteristics of the image corresponding to the input image signal 10 do not influence the detection of watermark information. The normalized specific frequency component signal is input to a second accumulator 44.

The second accumulator 44 accumulates the normalized specific frequency component signal for a second period of time, thereby generating a second accumulation signal. The second period of time is set to, for example, 15 sec., 30 sec., or 1 min., which is longer than the first period of time as the accumulation period of the first accumulator 41. The accumulator 44 is reset each time the second accumulation signal is generated, and resumes accumulation of the normalized specific frequency component signal. The second accumulation signal is input to a watermark information estimation unit 45, where the peak level of the specific frequency component signal is searched for, and the polarity of the peak level of the second accumulation signal is determined, thereby detecting watermark information 13.

In the fourth embodiment, the watermark information detector 12 computes the auto-correlation function of a size-reduced image signal, and accumulates this function, thereby extracting a specific frequency component signal. The specific frequency component signal is normalized in amplitude and accumulated, and watermark information is detected from the accumulated, normalized specific frequency component signal. The auto-correlation function of a size-reduced image signal is computed while varying the amount of phase control performed on the size-reduced image signal, thereby searching for the peak level of a specific frequency component signal and determining the polarity of the peak level. By virtue of this process, watermark information can be easily detected from an input image signal against which an attack of scaling was made. In this embodiment, since the auto-correlation function is accumulated and filtered by the specific frequency component extraction unit 21, the number of filtering operations can be reduced, compared to the case where the cross-correlation value between an input image signal and a filtered image signal is accumulated. Accordingly, the cost required for detecting watermark information can be reduced without degrading the watermark information detection performance.

The watermark information detector 12 shown in FIG. 6 can also detect watermark information in an image signal under an attack of scaling. Accordingly, size reduction processing can be performed on the input image signal 10 before extracting a specific frequency component signal. This being so, watermark information can be extracted even from a high-resolution input image signal, simply by adding the cost required for size reduction.

Fifth Embodiment

Figure 7:
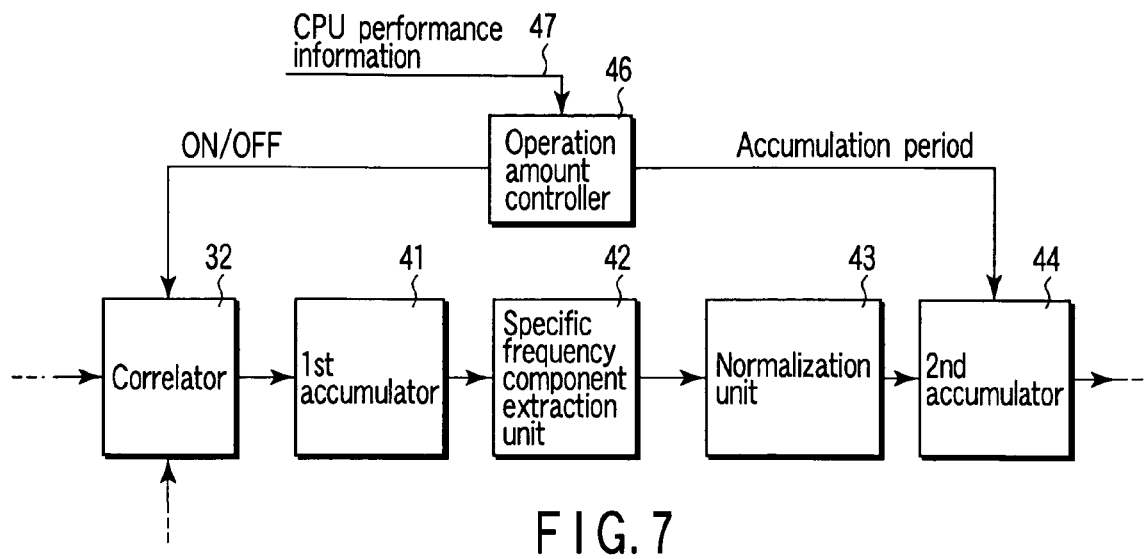
FIG. 7 is a block diagram showing an essential part of a digital watermark detection apparatus according to a fifth embodiment of the present invention.

FIG. 7 shows an essential part of a digital watermark detection apparatus according to a fifth embodiment of the invention. This digital watermark detection apparatus incorporates an operation amount controller 46, in addition to the elements employed in the digital watermark detection apparatus of FIG. 6. In this embodiment, it is assumed that part or all of the processes of the digital watermark detection apparatus is realized by software processing, using a processor, such as a versatile or dedicated CPU (Central Processing Unit), DSP (Digital Signal Processor), etc. The operation amount controller 46 acquires, from, for example, an OS (Operating System), information 47 indicative of the throughput of the processor. "Throughput" means the original performance of the processor and/or the ever-changing performance of the processor.

If the throughput of the processor is relatively low, the operation amount controller 46 controls the correlator 32 so as to reduce the operation amount of the correlator 32 per unit time. Specifically, if the throughput is lower than a predetermined threshold value, the operation amount controller 46 periodically stops the operation of the correlator 32 in units of pixels, lines, fields or frames of the input image signal 10.

If the operation amount of the correlator 32 is reduced, the accumulation amount of the specific frequency component signal at the second accumulator 44 is reduced. Accordingly, the watermark information detection performance degrades. To secure the accumulation amount, the operation amount controller 46 controls the accumulation period (second period) of the accumulator 44. If, for example, the correlator 32 is stopped every two lines to perform a correlation operation every two lines, the operation amount per unit time is halved, accordingly the accumulation amount of the correlation value is halved. To secure the same accumulation amount as that obtained when the operation amount of the correlator 32 is not controlled, the operation amount controller 46 doubles the accumulation period of the accumulator 44.

This enables watermark information to be detected without applying an excessive load on the processor. Therefore, watermark information detection can be realized even if a low-performance processor is used, or the processor is also used for a process other than digital watermark detection, which would drop the processor throughput below the threshold value. Conversely, if the throughput of the processor is higher than required, the frequency of stopping the correlation operation can be reduced to increase the accumulation amount and enhance the performance of watermark information detection.

As described above, in the fifth embodiment, if the throughput of the process is low, the operation amount per unit time of the processor can be reduced with the watermark information detection performance unchanged, by reducing the operation amount per unit time of the correlator 32, and reducing the accumulation amount per unit time of the second accumulator 44 and increasing the accumulation period of the accumulator. On the other hand, if the throughput of the process is high, the watermark information detection performance can be enhanced by increasing the operation amount and accumulation amount per unit time of the correlator 32 and second accumulator 44, respectively.

Although in the fifth embodiment, the operation amount controller 46 is incorporated in the digital watermark detection apparatus shown in FIG. 6, it may be incorporated in that shown in FIG. 2.

Sixth Embodiment

Figure 8:
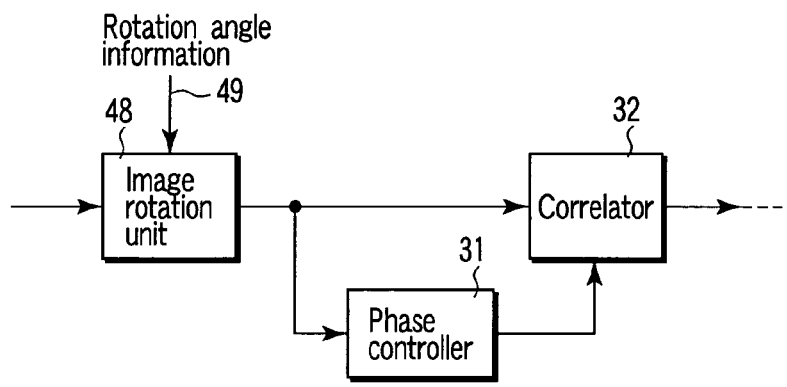
FIG. 8 is a block diagram showing an essential part of a digital watermark detection apparatus according to a sixth embodiment of the present invention.

FIG. 8 shows an essential part of a digital watermark detection apparatus according to a sixth embodiment of the invention. In the sixth embodiment, to detect a digital watermark embedded in an image signal subjected to rotational transform, an image rotation unit 48 for rotating an image corresponding to the size-reduced image signal is provided before the correlator 32. In FIG. 8, the image rotation unit 48 is located just after the image size reduction unit 11. However, the image rotation unit 48 may be located just before the size reduction unit 11. The image rotation unit 48 outputs an image signal corresponding to an image obtained by rotating, in accordance with rotation angle information 49, the image corresponding to the size-reduced image signal. As a result, even if the input image signal 10 is under an attack of rotation, watermark information can be acquired therefrom.

Figure 9:
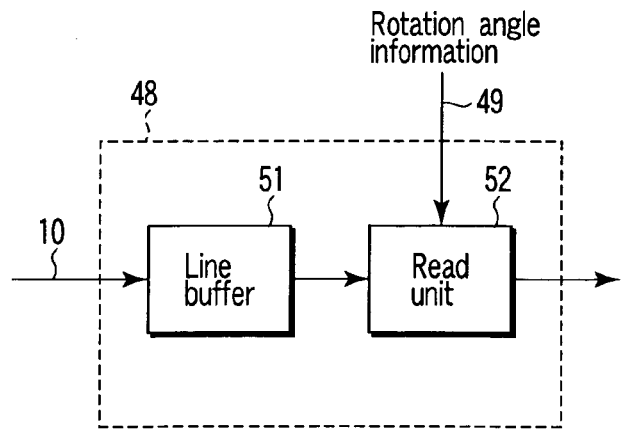
FIG. 9 is a block diagram illustrating a structure example of the image rotation unit appearing in FIG. 8.

As shown in, for example, FIG. 9, the image rotation unit 48 comprises a line buffer 51 and read unit 52. The line buffer 51 reads and temporarily stores a plurality of line components of the size-reduced image signal. The line components contained in the image signal stored in the line buffer 51 are read by the read unit 52, with the reading start portions of the line components being shifted to one another in accordance with the rotation angle information 49. The read unit 52 sets a line shift amount corresponding to the rotation angle information 49.

Figure 10:
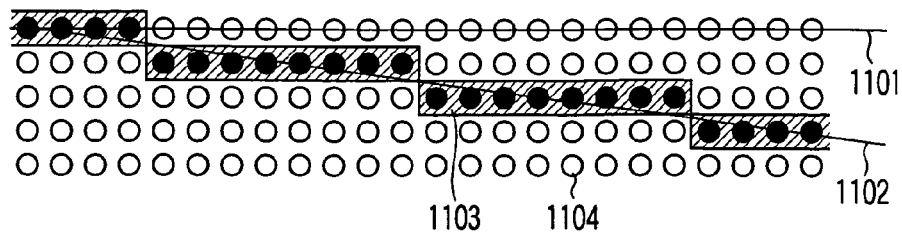
FIG. 10 is a view useful in explaining computation of correlation performed in an oblique direction, in the sixth embodiment, to detect a digital watermark from an image subjected to rotational transform.

FIG. 10 shows the arrangement of image pixels 1104 corresponding to the input image signal 10. In the correlator incorporated in a general digital watermark detection apparatus, a correlation operation is performed in a line direction indicated by reference numeral 1101. On the other hand, in this embodiment, concerning an input image signal under an attack of rotation, the image rotation unit 48 shifts each line component input to the correlator 32 in units of predetermined numbers of pixels, as indicated by reference numeral 1102. As a result, image signal components, which correspond to pixels 113 expressed by black dots and arranged in an oblique direction as shown in FIG. 9, are sequentially input to the correlator 13, whereby a correlation operation is performed on the pixels in the oblique direction.

If the amount of line shifting in the read unit 52 according to the rotation angle information 49 is changed at a position corresponding to integral multiples of a predetermined number n (e.g., eight) of pixels, for example, at the position of the pixel 1103 in FIG. 10, image signal data in the line buffer 51 can be effectively accessed. Accordingly, even if an image corresponding to the input image signal 10 is rotated at high speed, digital watermark information can be extracted therefrom.

Since the rotational angle $\theta$ of the image is as small as 0 ($\theta \approx 0$), $\cos \theta \approx 1$, $\sin \theta \approx \tan \theta \approx \theta$, line shifting of an input image signal under an attack of scaling input to the correlator 32, performed by the image rotation unit 48 shown in FIG. 9, enables watermark information to be extracted from the input image signal without increasing the operation amount.

As described above, in the sixth embodiment, the line components of an image signal (input image signal or size-reduced image signal) input to the correlator 32 are gradually shifted, thereby approximating the rotation of the image. In particular, if the image rotation unit 48 is formed of the line buffer 51 and read unit 52 as shown in FIG. 10, watermark information embedded in an input image signal under an attack of rotation can be detected simply by changing a read address in the read unit 52 to change the amount of line shifting. Therefore, increases in the operation amount, the memory bandwidth of the line buffer 51 and the entire circuit scale can be avoided. Furthermore, when the position at which the amount of line shifting is changed is made to correspond to the word width in the line buffer 51, the efficiency of memory access can be enhanced, therefore watermark information can be easily detected even if the input image signal 10 is under an attack of high-speed rotation.

EXAMPLE 1 OF WATERMARK INFORMATION ESTIMATION UNIT

Figure 11:
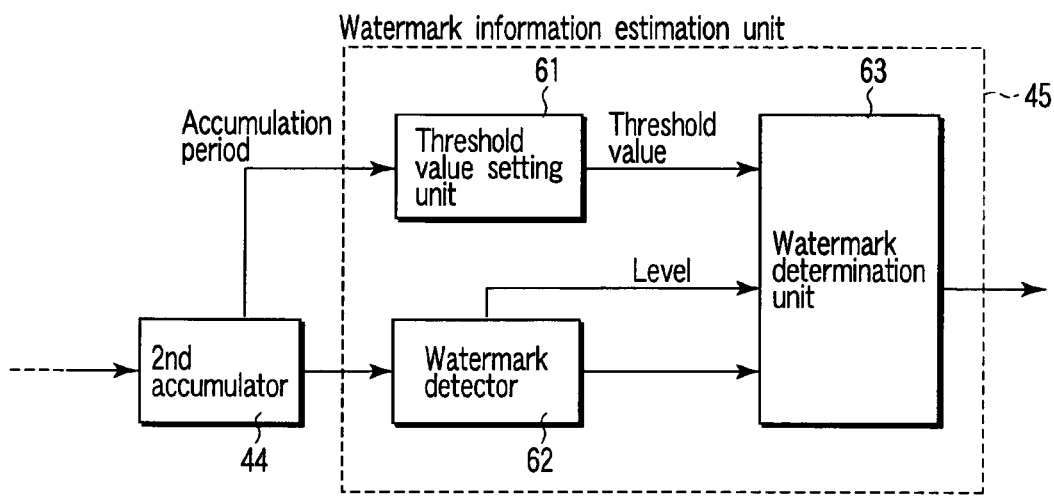
FIG. 11 is a block diagram illustrating a first concrete example of a watermark estimation unit incorporated in the digital watermark detection apparatus.
Figure 12:
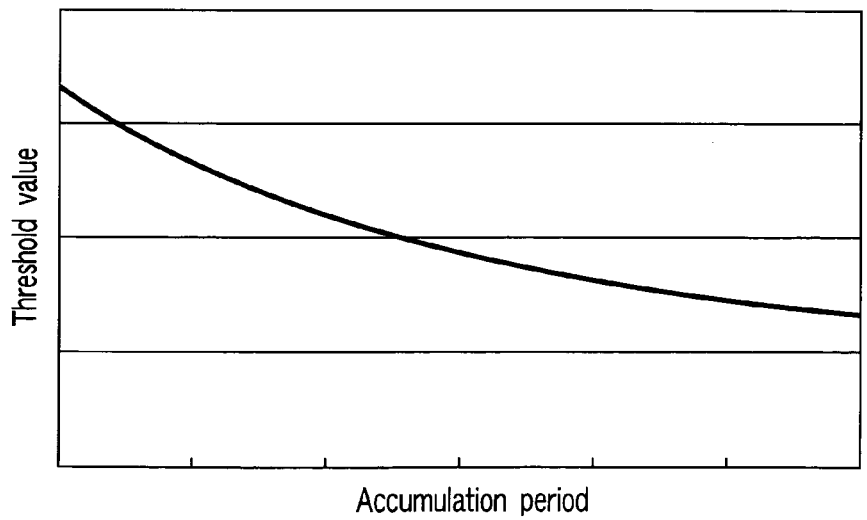
FIG. 12 is a view illustrating a determination threshold value for watermark information detection, which varies in accordance with an accumulation period.

Referring to FIG. 11, a description will be given of an example of the watermark information estimation unit 45 in the digital watermark detection apparatus of FIG. 6. In this example, the watermark information estimation unit 45 comprises a threshold-setting unit 61, watermark detector 22 and watermark determination unit 63.

The threshold-setting unit 61 acquires information indicative of a second period of time corresponding to the accumulation period of the second accumulator 44 shown in FIG. 6, thereby changing, based on the accumulation period, the threshold value set in the watermark determination unit 63 for determining watermark information. Specifically, the longer the accumulation period, the lower the threshold value is set. The watermark detector 62 detects watermark information from a second accumulation signal (obtained by normalizing and accumulating the specific frequency component of an auto-correlation signal) output from the second accumulator 44, thereby providing the watermark determination unit 63 with the detected watermark information and level (the absolute value of the amplitude of the peak of the second accumulation signal).

The watermark determination unit 63 compares the level supplied from the watermark detector 62 with the threshold value set by the threshold-setting unit 61. If the level is not less than the threshold value, the watermark determination unit 63 determines that the watermark detector 62 has correctly detected watermark information, and outputs the detected watermark information. If, on the other hand, the level is less than the threshold value, the watermark determination unit 63 determines that no watermark information is embedded, and outputs a message "No Watermark". As mentioned above, basically, the longer the accumulation period, the lower the threshold value. However, the threshold value may also be set higher as the accumulation period is increased. The watermark determination unit 63 may perform determination in units of predetermined periods (e.g., 15 sec., 30 sec., one minute, etc.) using a threshold value corresponding to the period, or may perform determination using a continuously varied threshold value.

As described above, in the sixth embodiment, when the accumulation period is set long, the threshold value for determining watermark information is lowered to increase the probability of detection of watermark information. Accordingly, the detection performance is enhanced without increasing the operation amount and circuit scale required for the detection of watermark information.

EXAMPLE 2 OF WATERMARK INFORMATION ESTIMATION UNIT

Referring to FIG. 13, a description will be given of another example of the watermark information estimation unit 45 in the digital watermark detection apparatus of FIG. 6. In this example, the watermark information estimation unit 45 comprises at least two watermark detectors 71A and 71B that employ different watermark detection manners, and watermark determination unit 72. The watermark detectors 71A and 71B individually detect watermark information. The watermark determination unit 72 determines whether the detection results of the detectors 71A and 71B are identical to each other.

The watermark detector 71A receives a second accumulation signal output from the accumulator 44 and indicative of the normalized and accumulated specific frequency component of an auto-correlation signal, then detects watermark information in the second accumulation signal using a first detection manner, and supplies the detection result to the watermark determination unit 72. Similarly, the watermark detector 71B detects watermark information in the second accumulation signal using a second detection manner, and supplies the detection result to the watermark determination unit 72. The watermark determination unit 72 compares the watermark information items from the watermark detectors 71A and 71B. If they are identical, the watermark determination unit 72 determines that the digital watermark has been detected, and outputs the detected watermark information. If they are not identical, the unit 72 determines that no digital watermark is embedded, and outputs a message "No Watermark".

If, for example, the watermark detector 71A has detected watermark information "A" using the first detection manner, and the watermark detector 71B has detected watermark information "A" using the second detection manner, the two detection results are identical and hence watermark information "A" is finally acquired as a detection result. On the other hand, if watermark information items "B" and "C" are acquired by the first and second detection manners, respectively, the two detection results differ from each other and hence watermark information cannot be confirmed, with the result that it is determined that no watermark information is embedded. The same idea as that of this embodiment can be utilized when three or more detection manners are employed.

As stated above, the embodiment employs comparison of watermark information items obtained using a plurality of detection manners, which enables accurate detection of watermark information and reduction of the probability of erroneous detection.

EXAMPLE 3 OF WATERMARK INFORMATION ESTIMATION UNIT

Referring to FIG. 14, a description will be given of a further example of the watermark information estimation unit 45. In this example, in addition to the second accumulator 44 shown in FIG. 6, a third accumulator 80 is provided before the watermark information estimation unit 44 for accumulating the normalized specific frequency component of an auto-correlation signal. Further, the watermark information estimation unit 45 comprises a watermark detector 81, watermark provisional detector 82, provisional detection determination unit 83 and watermark determination unit 84.

The second accumulator 44 accumulates a normalized specific frequency component signal for the second period of time, and supplies a second accumulation signal to the watermark detector 81. The watermark detector 81 detects watermark information, and supplies a detection result to the watermark determination unit 84. The third accumulator 80 accumulates the normalized specific frequency component signal for a third period of time that is 1/n (n: an integer higher than 1) of the second period, and outputs an accumulation signal to the watermark provisional detector 82.

The watermark provisional detector 82 performs provisional detection of watermark information, and outputs a provisional detection result to the provisional detection determination unit 83. After the provisional detection determination unit 83 accumulates a number n of provisional detection results, and compares them, it supplies the watermark determination unit 84 with a determination result indicative of whether or not more than half of the number n of provisional detection results are identical to each other.

If the watermark determination unit 84 receives, from the provisional determination unit 83, a determination result indicating that more than half of the number n of provisional detection results are identical, it determines that watermark information has been detected, and outputs the watermark information supplied from the watermark detector 81. On the other hand, if the watermark determination unit 84 receives, from the provisional determination unit 83, a determination result indicating that not more than half of the number n of provisional detection results are identical, it determines that no watermark information is embedded, and outputs a message "No Watermark".

Specifically, if the detection period of the watermark provisional detector 82 is 10 sec. and n=2, it is determined that watermark information "A" has been provisionally detected within the first five seconds, and has also provisionally been detected within the last five seconds. In this case, since more than half of the provisional detection results are identical to each other, the detection results are determined to be valid. As a result, the provisional detection determination unit 83 determines that watermark information is embedded, and the watermark detector 81 outputs the detected watermark information. On the other hand, if it is determined that watermark information "B" has been provisionally detected within the first five seconds, and watermark information "C" has been provisionally detected within the last five seconds, more than half of the provisional detection results are not identical to each other, thereby determining that the detection results are invalid. As a result, it is determined that no watermark information is embedded.

As described above, in the sixth embodiment, temporal continuity of watermark information is estimated, which enables watermark information to be correctly detected, i.e., enables the probability of erroneous detection of watermark information to be reduced.

(Re: Correlator)

A detailed description will now be given of the correlator 23 or 32 incorporated in the above-described digital watermark detection apparatuses. In general, a correlation operation means to sum up the multiplication results of corresponding pixel values contained in certain signals X(n) and Y(n). The cross-correlation value (correlation coefficient) C of the certain signals X(n) and Y(n) is given by the following equation (1):

$$C = \sum_{n=0}^{l-1} X(n) \times Y(n) \quad (1)$$

where 1 represents a signal length. In the case of auto-correlation, Y(n)=X(n).

FIG. 15 is a view useful in explaining a general correlation operation. In this operation, multiplication and addition are performed a number of times corresponding to the number of pixels, therefore a large number of operations are required. To reduce the number of operations, down-sampling of pixel values is performed. For example, a block, on which multiplication and addition are performed, and a block, on which these operations are not performed, are switched in units of numbers of pixels n, thereby reducing the operation amount (to, for example, 1/n of the conventional one). As a result, the accuracy of a correlation coefficient is reduced, but is still sufficient for the detection of watermark information. Thus, the operation amount can be effectively reduced. Specifically, if multiplication and addition are performed concerning every other pixel as shown in FIG. 16, the correlation coefficient C is given by $$C = \sum_{n=0}^{l-1} \begin{cases} X(n) \times Y(n) & \text{if } n = \text{even} \\ 0 & \text{else} \end{cases} \quad (2)$$

The pixel, on which multiplication is performed, and the pixel, on which multiplication is not performed, are exchangeable. As a result, the number of operations is half that conventionally required.

Alternatively, multiplication and addition may be performed for the first eight pixels, and not for the next eight pixels, as is shown in FIG. 17. If this operation is repeated, the correlation coefficient C is given by $$C = \sum_{n=0}^{l-1} \begin{cases} X(n) \times Y(n) & \text{if } n/8 = \text{even} \\ 0 & \text{else} \end{cases} \quad (3)$$

Also in this case, the pixel, on which multiplication is performed, and the pixel, on which multiplication is not performed, are exchangeable. As a result, the operation amount is half that conventionally required.

Further, the operation may be modified as shown in FIG. 18 and as given by formulas (2) and (3), where multiplication and addition are performed concerning every other pixel of the first eight pixels, but not performed concerning the next eight pixels. In this case, the correlation coefficient C is given by the following formula (4), and the operation amount is ¼ of the conventional one.

$$C = \sum_{n=0}^{l-1} \begin{cases} X(n) \times Y(n) & \text{if } n/8 = \text{even \& } n = \text{even} \\ 0 & \text{else} \end{cases} \quad (4)$$

As described above, by performing the correlation operation with pixel values thinned, the operation amount and circuit scale required for it can be effectively reduced without degrading the detection performance of watermark information.

Seventh Embodiment

Figure 19:
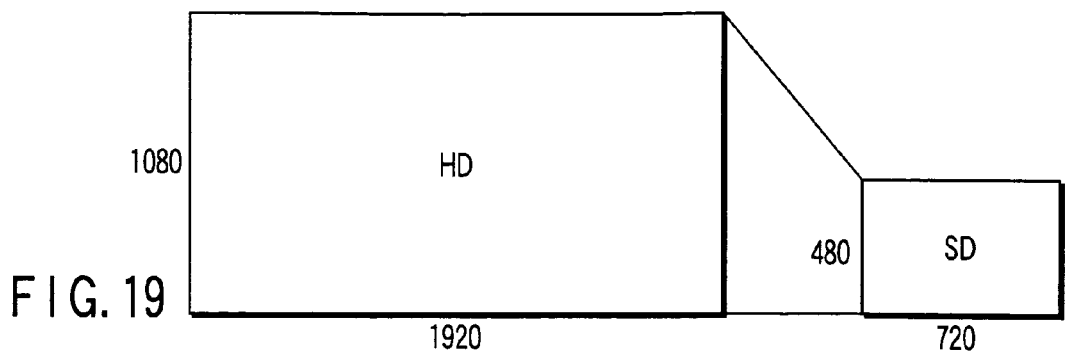
FIG. 19 is a view useful in explaining an HD image and SD image.

A description will now be given of detection of watermark information embedded in a high definition (HD) image signal. As shown in FIG. 19, an HD image has a size of, for example, (1920×1080) pixels (i.e., 1920 pixels in the horizontal direction and 1080 pixels in the vertical direction). On the other hand, a standard definition (SD) image based on the NTSC scheme has a size of, for example, (720×480) pixels (i.e., 720 pixels in the horizontal direction and 480 pixels in the vertical direction). Thus, the size of the HD image is six times that of the SD image. Therefore, to directly detect watermark information in an HD image signal, a lot of time and cost are required.

A digital watermark detection apparatus according to a seventh embodiment can extract watermark information even from a signal under an attack of scaling. Accordingly, if the input image signal 10 is an HD image signal, a down converter for down-converting an HD image signal into an SD image signal is used as the size reduction unit 11, and the resultant SD image signal is input to the watermark information detector 12 to extract watermark information therefrom. Thus, watermark information embedded in an HD image signal can be detected at low cost.

At present, there exist HDTV tuners for digital broadcasting, video cassette recorders (VCRs) and hard disk drive (HDD) recorders as video devices for dealing with HD image signals. Further, optical disk systems, such as digital versatile discs (DVDs), which correspond to HD image signals, are now being developed. These video devices corresponding to HD image signals generally have a function for outputting SD image signals, as well as HD image signals. In other words, the video devices have a function for converting an HD image signal into an SD image signal. Accordingly, if the down-conversion function of the video devices is used instead of the image size reduction unit 11, an increase in cost for down conversion is avoidable.

Figure 20:
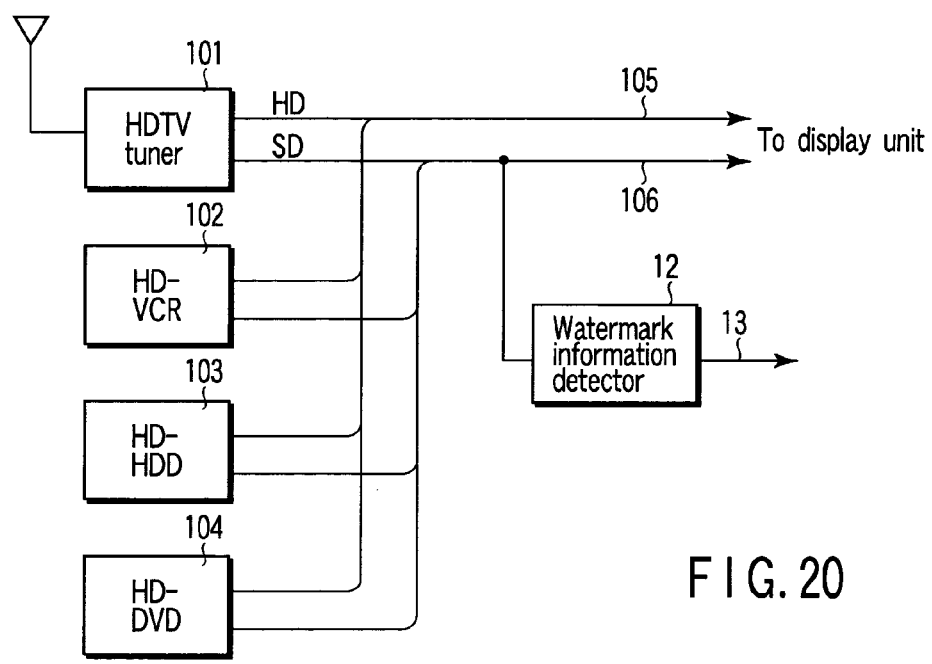
FIG. 20 is a block diagram a system according to a seventh embodiment of the present invention.

FIG. 20 illustrates the configuration of the system employed in the seventh embodiment. HD and SD image signals 105 and 106 are output from one or more of the video devices 101, 102, 103 and 104 provided outside the digital watermark detection apparatus, and are supplied to a display device (not shown). The SD image signal 106 is also input to the watermark information detector 12. The watermark information detector 12 has the configuration as shown in FIGS. 2, 5 or 6. Thus, an increase in cost for down conversion can be avoided by using, instead of the image size reduction unit 11, such a video device 101, 102, 103 or 104 as has a function for converting an HD image signal into an SD image signal.

Eighth Embodiment

As stated in the seventh embodiment, if an HD image signal is down-converted into an SD image signal, the number of pixels in the horizontal direction is reduced to ⅜, therefore the frequency characteristic of the specific frequency component signal used in the previously mentioned digital watermark embedding apparatus significantly varies. If the same HPF or SPF as that used as the specific frequency component extraction unit in the digital watermark embedding apparatus is employed as the specific frequency component extraction unit 33 or 42 in the digital watermark detection apparatus, the performance of detecting digital watermark information may degrade. To avoid this, in the eighth embodiment, the frequency component extracted by the digital watermark detection apparatus is changed in accordance with the scaling ratio of an input image signal due to down conversion.

This will be explained with reference to FIGS. 21 and 22. Assuming that curve 211 in FIG. 21 indicates the normalized frequency characteristic of watermark information embedded in an HD image signal, curve 221 in FIG. 22 indicates that of watermark information embedded in an SD image signal obtained by down-converting the HD image signal. If a BPF is used as the specific frequency component extraction unit in the digital watermark embedding apparatus, and if the same BPF as the above is used as the specific frequency component extraction unit 33 or 42 in the digital watermark detection apparatus, the frequency component extracted by the specific frequency component extraction unit 33 or 42 is indicated by curve 222 in FIG. 22. Curve 222 does not correspond to curve 221 that indicates the normalized frequency characteristic of the embedded watermark information.

In light of this, a BPF, which has a normalized frequency characteristic indicated by curve 223 that is similar to curve 221 corresponding to the normalized frequency characteristic of the embedded watermark information, is used as the specific frequency component extraction unit 33 or 42. As a result, more accurate watermark information detection can be performed.

Figure 23:
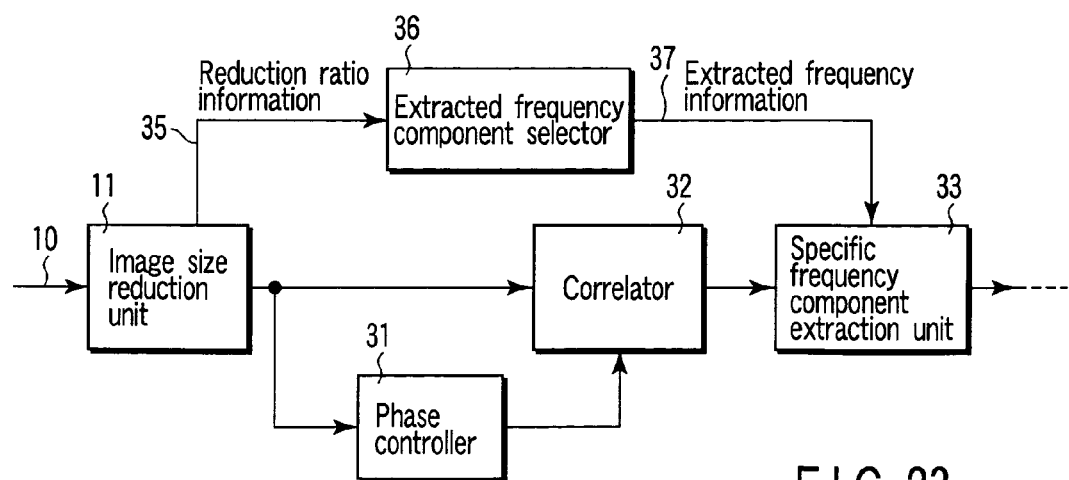
FIG. 23 is a block diagram showing an essential part of a digital watermark detection apparatus according to an eighth embodiment of the present invention.

FIG. 23 is a block diagram showing an essential part of a digital watermark detection apparatus according to an eighth embodiment of the invention. The image size reduction unit 11 reduces the size of image data contained in an input image signal 10 when necessary, and outputs information 35 indicating a reduction ratio. If, for example, the input image signal is an HD image signal, the image size reduction unit 11 down-converts the HD image signal into an SD image signal, and outputs, as reduction ratio information 35, a horizontal reduction ratio=720/1920 and a vertical reduction ratio=480/1080. If, on the other hand, the input image signal is an SD image signal the image size reduction-unit 11 performs no down-conversion, and outputs the SD image signal itself, together with reduction ratio information 35 indicating that both the vertical and horizontal reduction ratios are 1.

The reduction ratio information 35 is input to a to-be-extracted-frequency-component selector 36. The to-be-extracted-frequency-component selector 36 determines the frequency to be extracted by the specific frequency component extraction unit 33, based on the reduction ratio information 35, and supplies the unit 33 with to-be-extracted-frequency information 37 indicating the determined frequency. The specific frequency component extraction unit 33 extracts a specific frequency component signal having a frequency designated by the to-be-extracted-frequency information 37.

As described above, in the digital watermark detection apparatus of the embodiment, when various image signals of different image sizes such as HD and SD image signals, are input as the input image signals 10, the specific frequency component extraction unit 33 varies the to-be-extracted frequency in accordance with the reduction ratio (including a ratio of 1) for each image signal. As a result, the digital watermark detection apparatus of the embodiment can detect watermark information at high detection accuracy in input image signals of different image sizes.

If the digital watermark detection apparatus has high detection performance, HD image signals may be input thereto without image size reduction processing. In this case, the specific frequency component extraction unit 33 can be formed of the same HPF or BPF as that employed in the digital watermark embedding apparatus.

The digital watermark detection apparatus shown in FIG. 23 is formed of the combination of the digital watermark detection apparatus of FIG. 5 and the to-be-extracted-frequency-component selector 36. However, it may be formed of the combination of the digital watermark detection apparatus of FIG. 2, 6 or 7 and the to-be-extracted-frequency-component selector 36. Further, instead of the image size reduction unit 11 shown in FIG. 23, the down-conversion function of a video device for down-converting an HD image signal into an SD image signal may be utilized, as in the seventh embodiment. In this case, reduction ratio information or information related to the reduction ratio may be supplied from the video device to the to-be-extracted-frequency-component selector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark detection apparatus to detect watermark information embedded in an input image signal, comprising:

an image-size-reduction unit configured to reduce an image size of the input image signal by reducing resolution of the input image signal and to generate a size-reduced image signal; and a detector to detect the watermark information in the size-reduced image signal, the detector including:

a correlator to compute an auto-correlation function of the size-reduced image signal;

an extraction unit configured to extract a specific frequency component signal by filtering the auto-correlation function; and an estimation unit configured to estimate the watermark information from the specific frequency component signal, wherein the correlator includes a controller which controls a phase of the size-reduced image signal to generate a phase-controlled image signal, the correlator computing, as the auto-correlation function, a correlation value between the phase-controlled image signal and the size-reduced image signal.

2. A digital watermark detection apparatus to detect watermark information embedded in an input image signal, comprising:
- an image-size-reduction unit configured to reduce an image size of the input image signal by reducing resolution of the input image signal and to generate a size-reduced image signal; and
- a detector to detect the watermark information in the size-reduced image signal, the detector including:
  - a correlator to compute an auto-correlation function of the size-reduced image signal;
  - an extraction unit configured to extract a specific frequency component signal by filtering the auto-correlation function; and
  - an estimation unit configured to estimate the watermark information from the specific frequency component signal,
  - wherein the estimation unit estimates the watermark information by determining a polarity of a peak of the specific frequency component signal.

3. A digital watermark detection apparatus to detect watermark information embedded in an input image signal, comprising:
- an image-size-reduction unit configured to reduce an image size of the input image signal by reducing resolution of the input image signal and to generate a size-reduced image signal; and
- a detector to detect the watermark information in the size-reduced image signal, the detector including:
  - a correlator which computes an auto-correlation function of the size-reduced image signal;
  - a first accumulator which accumulates the auto-correlation function for a first period of time to generate a first accumulation signal;
  - an extraction unit configured to extract a specific frequency component signal from the first accumulation signal;
  - a normalizing unit configured to normalize an amplitude of the specific frequency component signal;
  - a second accumulator which accumulates the normalized specific frequency component signal for a second period of time longer than the first period of time to generate a second accumulation signal; and
  - an estimation unit configured to estimate the watermark information from the second accumulation signal;
  - wherein the correlator includes a controller which controls a phase of the size-reduced image signal to generate a phase-controlled image signal, the correlator computing, as the auto-correlation function, a correlation value between the phase-controlled image signal and the size-reduced image signal.

4. A digital watermark detection apparatus to detect watermark information embedded in an input image signal, comprising:
- an image-size-reduction unit configured to reduce an image size of the input image signal by reducing resolution of the input image signal and to generate a size-reduced image signal; and
- a detector to detect the watermark information in the size-reduced image signal, the detector including:
  - an extraction unit configured to extract a specific frequency component signal from the size-reduced image signal;
  - a phase controller to control a phase of the specific frequency component signal;
  - a correlator to compute a cross-correlation value between the phase-controlled specific frequency component signal and the size-reduced image signal; and
  - an estimation unit configured to estimate the watermark information from the cross-correlation value; and
- an image rotation unit located before the detector and configured to perform an image rotation operation on the size-reduced image signal.

5. The digital watermark detection apparatus according to claim 4, wherein the image rotation unit comprises a line buffer to read a plurality of line components of the size-reduced image signal at a time and temporarily accumulates them, and a read unit configured to read the accumulated line components with reading portions of the line components being shifted to one another, and to supply the read line components to the correlator.

6. The digital watermark detection apparatus according to claim 5, wherein the read unit shifts the reading portions of the line component in units of a given number of pixels of the input image signal.

7. A digital watermark detection apparatus, to detect watermark information embedded in an input image signal, comprising:
- an image-size-reduction unit configured to reduce an image size of the input image signal by reducing resolution of the input image signal and to generate a size-reduced image signal; and
- a detector to detect the watermark information in the size-reduced image signal, the detector including:
  - an extraction unit configured to extract a specific frequency component signal from the size-reduced image signal;
  - a phase controller to control a phase of the specific frequency component signal;
  - a correlator to compute a cross-correlation value between the phase-controlled specific frequency component signal and the size-reduced image signal; and
  - an estimation unit configured to estimate the watermark information from the cross-correlation value;
- wherein the size-reduced image signal has a particular reduction ratio with respect to the input image signal, and the specific frequency component signal has a frequency corresponding to the particular reduction ratio of the size-reduced image signal.

* * * * *